(12) United States Patent
Hsieh

(10) Patent No.: US 11,091,222 B1
(45) Date of Patent: Aug. 17, 2021

(54) MULTI-FUNCTION RACING TYPE BICYCLE PEDAL

(71) Applicant: Chin-Long Hsieh, Taichung (TW)

(72) Inventor: Chin-Long Hsieh, Taichung (TW)

( * ) Notice: Subject to any disclaimer, the term of this patent is extended or adjusted under 35 U.S.C. 154(b) by 0 days.

(21) Appl. No.: 17/120,246

(22) Filed: Dec. 13, 2020

(51) Int. Cl.
*B62M 3/08* (2006.01)

(52) U.S. Cl.
CPC .......... *B62M 3/083* (2013.01); *B62M 3/086* (2013.01)

(58) Field of Classification Search
CPC ........ B62M 3/08; B62M 3/083; B62M 3/086; B62M 3/10; B62M 3/12; B62M 3/16
See application file for complete search history.

(56) References Cited

U.S. PATENT DOCUMENTS

| | | | | |
|---|---|---|---|---|
| 4,030,774 A * | 6/1977 | Foster | ...................... | B62L 3/08 280/261 |
| 4,033,199 A * | 7/1977 | Bouder | .................. | B62M 3/083 74/594.6 |
| 4,870,873 A * | 10/1989 | Tackles | .................... | A43B 5/14 74/594.6 |
| 5,417,128 A * | 5/1995 | Beyl | ...................... | B62M 3/086 36/131 |
| 2003/0051574 A1 * | 3/2003 | Muraoka | ................ | B62M 3/086 74/594.6 |
| 2003/0159538 A1 * | 8/2003 | Muraoka | ................ | B62M 3/086 74/594.6 |
| 2009/0139369 A1 * | 6/2009 | Takahama | .............. | B62M 3/086 74/594.6 |
| 2009/0235778 A1 * | 9/2009 | Chen | ...................... | B62M 3/086 74/594.6 |
| 2011/0048166 A1 * | 3/2011 | Lin | ........................ | B62M 3/086 74/594.6 |
| 2012/0048061 A1 * | 3/2012 | Lin | ........................ | B29C 45/14 74/594.6 |
| 2012/0132030 A1 * | 5/2012 | Kamada | ................. | B62M 3/086 74/594.6 |
| 2012/0192674 A1 * | 8/2012 | Chen | ...................... | B62M 3/086 74/594.6 |

(Continued)

FOREIGN PATENT DOCUMENTS

JP 3212043 U * 8/2017 ............ B62M 3/083

OTHER PUBLICATIONS

Machine Translation of JP 3212043, obtained Feb. 11, 2021.*

(Continued)

*Primary Examiner* — Thomas C Diaz
*Assistant Examiner* — Brian J McGovern

(57) ABSTRACT

A multi-function racing type bicycle pedal includes a pedal body, a connecting seat and a shoe clip. The pedal body has a spindle, a fixed front and an elastic rear. An engaging surface is formed between the fixed front and the elastic rear for optionally connecting a cleat. A connecting platform is formed on an opposite side of the engaging surface and at a front side and a rear side of the spindle. The connecting platform has a locking hole. The connecting seat is a flat plate and has a through hole corresponding to the locking hole for being passed through by a screw so as to removably fasten the connecting seat onto the connecting platform. An exposed surface of the connecting seat is provided with an anti-slip pattern. The shoe clip is an arcuate body and removably disposed on the connecting seat.

3 Claims, 5 Drawing Sheets

(56) References Cited

U.S. PATENT DOCUMENTS

| | | | | |
|---|---|---|---|---|
| 2013/0312569 | A1* | 11/2013 | Hsieh | B62M 3/086 74/594.6 |
| 2014/0251079 | A1* | 9/2014 | Chen | B62M 3/086 74/594.6 |
| 2016/0052583 | A1* | 2/2016 | Sasaki | G01L 5/13 74/594.4 |
| 2016/0052584 | A1* | 2/2016 | Sasaki | G01L 3/24 74/594.4 |
| 2018/0015984 | A1* | 1/2018 | Hsieh | B62M 3/08 |
| 2019/0054977 | A1* | 2/2019 | Golesh | B62M 3/086 |
| 2020/0353313 | A1* | 11/2020 | Chen | B62J 45/41 |

OTHER PUBLICATIONS

"Orthographic projection," Wikipedia page obtained Mar. 31, 2021, url:<https://en.wikipedia.org/wiki/Orthographic_projection>.*

"Orthographic projection," Encyclopedia Britannic online page obtained Mar. 31, 2021, url:<https://www.britannica.com/technology/orthographic-projection-engineering>.*

"Bicycle pedal," Wikipedia page dated by Wayback Machine to Apr. 9, 2019, obtained Apr. 6, 2021, url:<https://en.wikipedia.org/wiki/Bicycle_pedal#Clipless_pedals>.*

* cited by examiner

MULTI-FUNCTION RACING TYPE BICYCLE PEDAL

TECHNICAL FIELD

The invention relates to bicycles or the like, particularly to pedals of bicycles or the like.

RELATED ART

Pedals assembled in bicycles or the like have various types. For racing bikes such as road bikes or mountain bikes, to make two legs of a rider perform the highest efficiency, the rider's feet must be fixedly connected to pedals so as to step down with one leg and pull up with the other leg at the same time. This allows the rider to output his or her driving power to the pedals in a whole revolution of the cranks.

A clipless pedal uses its hook to engage with a cleat fitted to a sole of a cycling shoe, but unlocking such a clipless pedal must twist the heel outward in a specific direction. This unlocking is not an intuitive act and requires practice and wont. For beginners or riders who ride infrequently, unlocking may not be accomplished because of sudden nervousness. It is very dangerous and harmful. Before clipless pedals appear in the market, there were pedals with a toe clip which can bind the front of a rider's foot on the pedal. Such a pedal is worse than the clipless pedal in transmission efficiency and fixing effect, so it is almost eliminated in the market, but releasing the binding to the foot is intuitive and safe. Also, this type of pedal does not require to wear cycling shoes. Thus, it becomes active in the market again.

However, bicycles with clipless pedals cannot be used by users wearing general shoes other than exclusive cycling shoes and the clipless pedals cannot be added with toe clips. This is to be solved in the future.

SUMMARY OF THE INVENTION

An object of the invention is to provide a multi-function racing type bicycle pedal, which allows a clipless pedal to be able to be selectively added with a flat tread and a shoe clip. Thus, the pedal of the invention can serve as a clipless pedal, a platform pedal or a clipped pedal.

To accomplish the above object, the multi-function racing type bicycle pedal of the invention includes a pedal body, a connecting seat and a shoe clip. The pedal body has a spindle, a fixed front and an elastic rear. An engaging surface is formed between the fixed front and the elastic rear for optionally connecting a cleat. A connecting platform is formed on an opposite side of the engaging surface and at a front side and a rear side of the spindle. The connecting platform has a locking hole. The connecting seat is a flat plate and has a through hole corresponding to the locking hole for being passed through by a screw so as to removably fasten the connecting seat onto the connecting platform. An exposed surface of the connecting seat is provided with an anti-slip pattern. The shoe clip is an arcuate body and removably disposed on the connecting seat.

DETAILED DESCRIPTION OF THE INVENTION

In the following description, the directional terms: front", rear", "left" and "right" are based upon a riding status of a rider sitting on a bicycle with facing a handle bar. In detail, the term "front" means a direction toward the toe of a rider's shoe, the term "rear" means a direction toward the heel of a rider's shoe, the term "outer" means a direction which is opposite to an arch of a rider's shoe, the term "inner" means a direction toward an arch of a rider's shoe, the term "top side" means a side facing a sole of a rider's show, and the term "bottom side" means a side facing a pedal. These terms are also available in claims.

Figure 1:
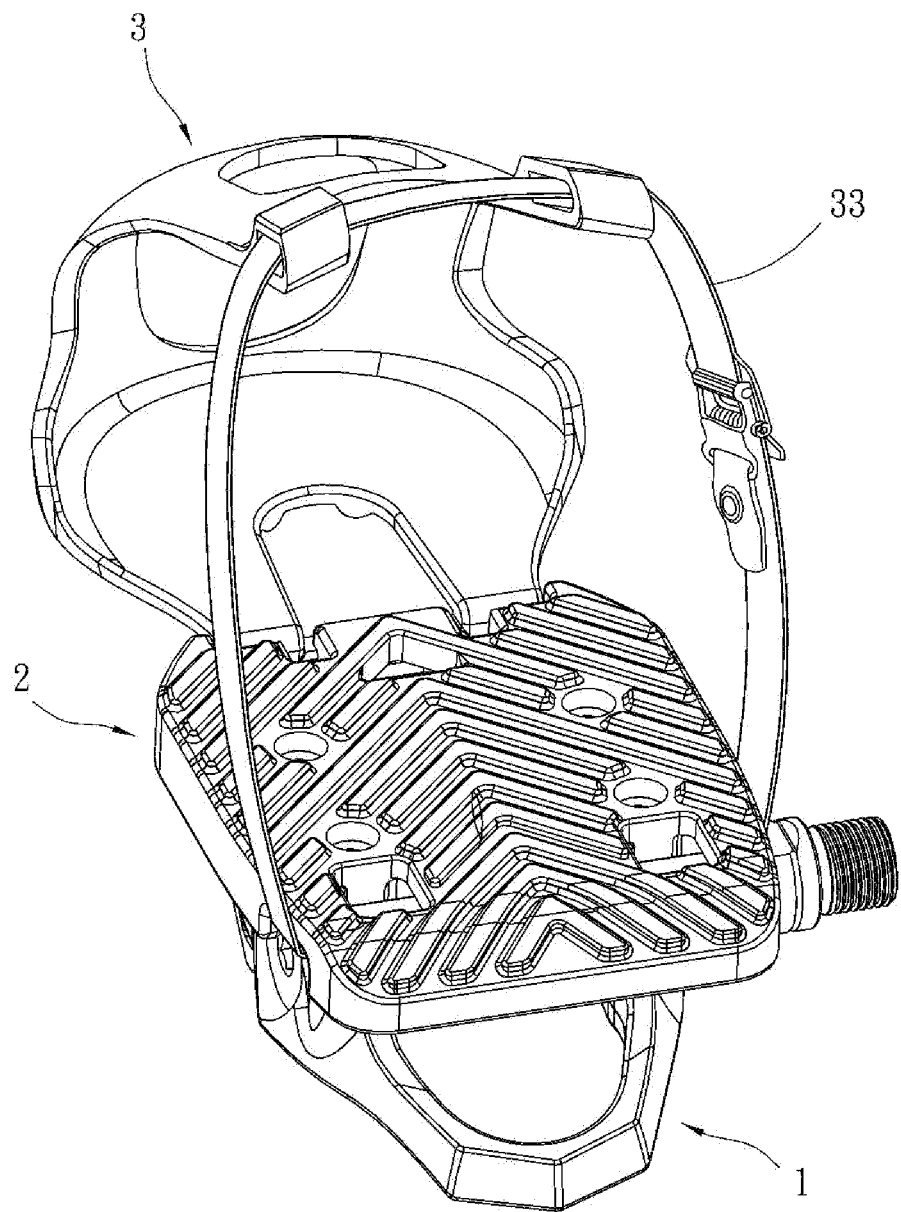
FIG. 1 is an assembled view of the invention.
Figure 2:
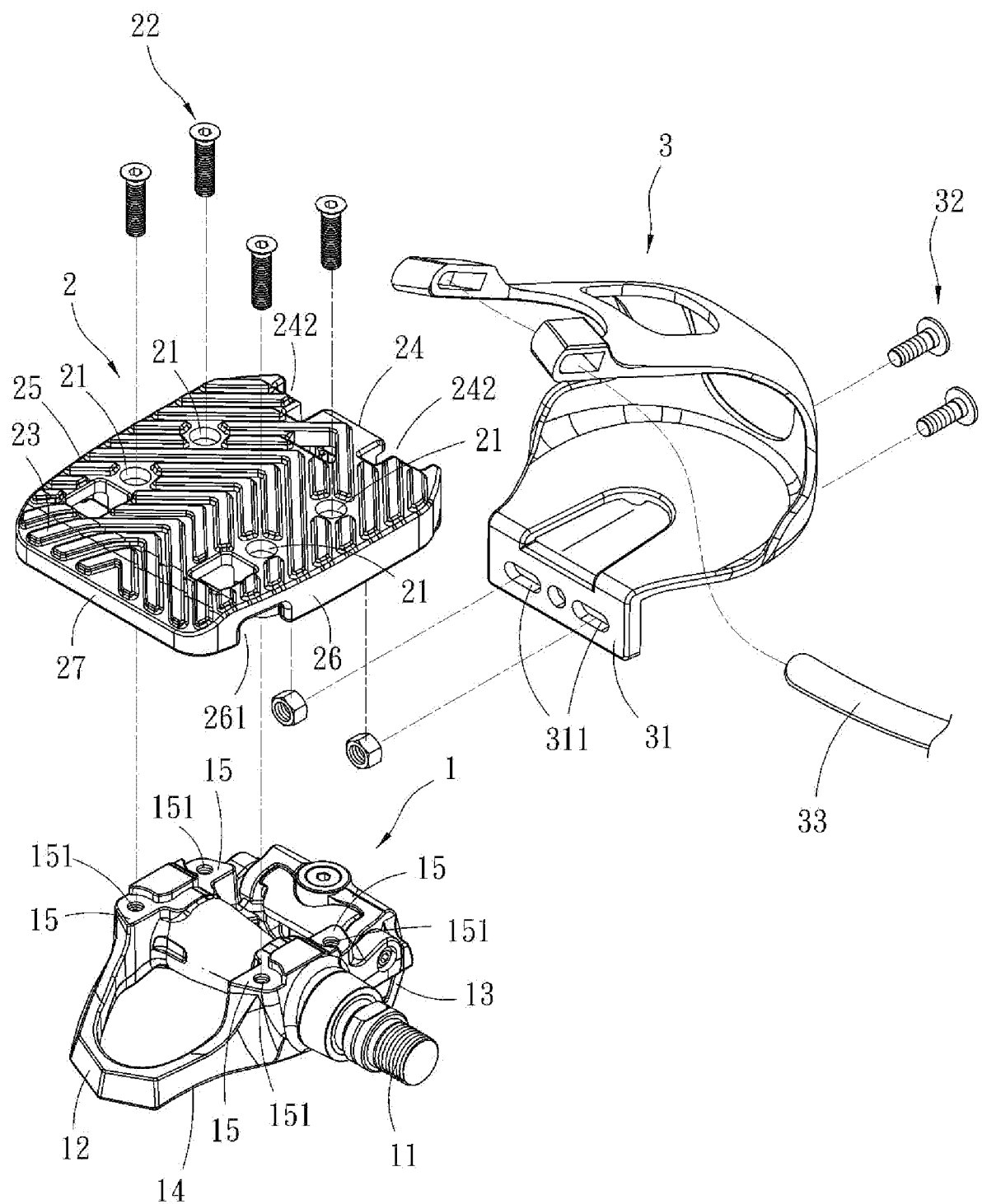
FIG. 2 is an exploded view of the invention.
Figure 3:
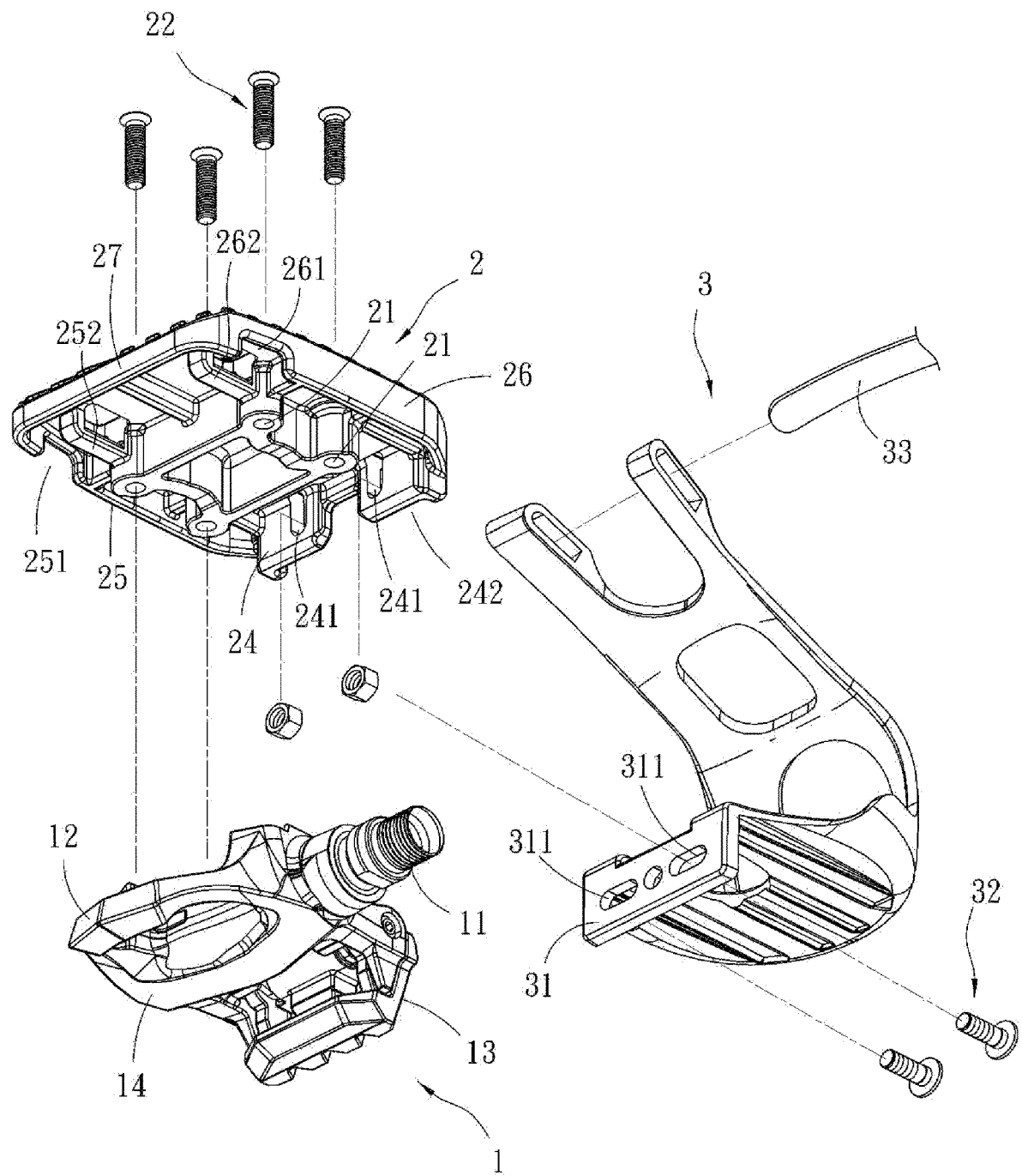
FIG. 3 is another exploded view of the invention.

Please refer to FIGS. 1-3. The multi-function racing type bicycle pedal of the invention includes a pedal body 1, a connecting seat 2 and a shoe clip 3. The connecting seat 2 is removably fixed on the pedal body 1 and the shoe clip 3 is removably fixed on the connecting seat 2.

The pedal body 1 is a clipless (step-in) pedal for road bikes. In other words, the pedal body 1 is a clipless pedal which can cooperate with a cleat mounted under a cycling shoe.

In detail, the pedal body 1 has a spindle 11, a fixed front 12 and an elastic rear 13. The fixed front 12 is integrally frontward extended from the spindle 11. The elastic rear 13 is pivoted to the rear of the spindle 11 and has an elastic mechanism for automatically locking a cleat mounted on a sole of a cycling shoe. An engaging surface 14 is formed on a side of the pedal body 1 and between the fixed front 12 and the elastic rear 13. A connecting platform 15 is formed on an opposite side of the engaging surface 14 and at a front side and a rear side of the spindle 11. In the shown embodiment, the connecting platform 15 is provided with four locking holes 151 at four corners before and behind the spindle 11, but not limited to this.

The connecting seat 2 is a flat plate with a substantially rectangular shape and has four sidewalls 24, 25, 26, 27. The connecting seat 2 has four through holes 21 separately corresponding to the locking holes 151 for being individually passed through by a screw 22 so as to fasten the connecting seat 2 onto the connecting platform 15 of the pedal body 1. An exposed surface (the upward main surface the figure) of the connecting seat 2 is provided with an anti-slip pattern 23. The connecting seat 2 can be stepped by a rider wearing general shoes (non-clipless shoes). The anti-slip pattern 23 can enhance friction.

The shoe clip is an arcuate body and removably disposed on the connecting seat. The front sidewall 24 of the connecting seat 2 is formed with two fixing holes 241 and is dented to form an indent portion 242. Each of the left sidewall 25 and the right sidewall 26 is formed with a recess 251, 261 near the rear sidewall 27. Preferably, the bottom of the connecting seat 2 is provided with one or more U-shaped bodies 252, 262 (in the shown embodiment, the U-shaped body is two in number). Inner holes of the U-shaped bodies 252, 262 correspond to the recesses 251, 261 in position.

The shoe clip 3 is an arcuate body and is provided with a binding strap 33 and a connecting mount 31 corresponding to the front sidewall 24 of the connecting seat 2. The connecting mount 31 can be embedded in the indent portion 242. The connecting mount 31 is formed with two via holes 311 separately corresponding to the fixing holes 241. The shoe clip 3 may be fixed to the connecting seat 2 by inserting two screws 32 through the fixing holes 241 and the via holes 311. The binding strap 33 of the shoe clip 3 can be embedded in the recesses 251, 261 and pass through the U-shaped bodies 252, 262 to make the binding strap 33 is surrounded between the shoe clip 3 and the connecting seta 2.

Figure 4:
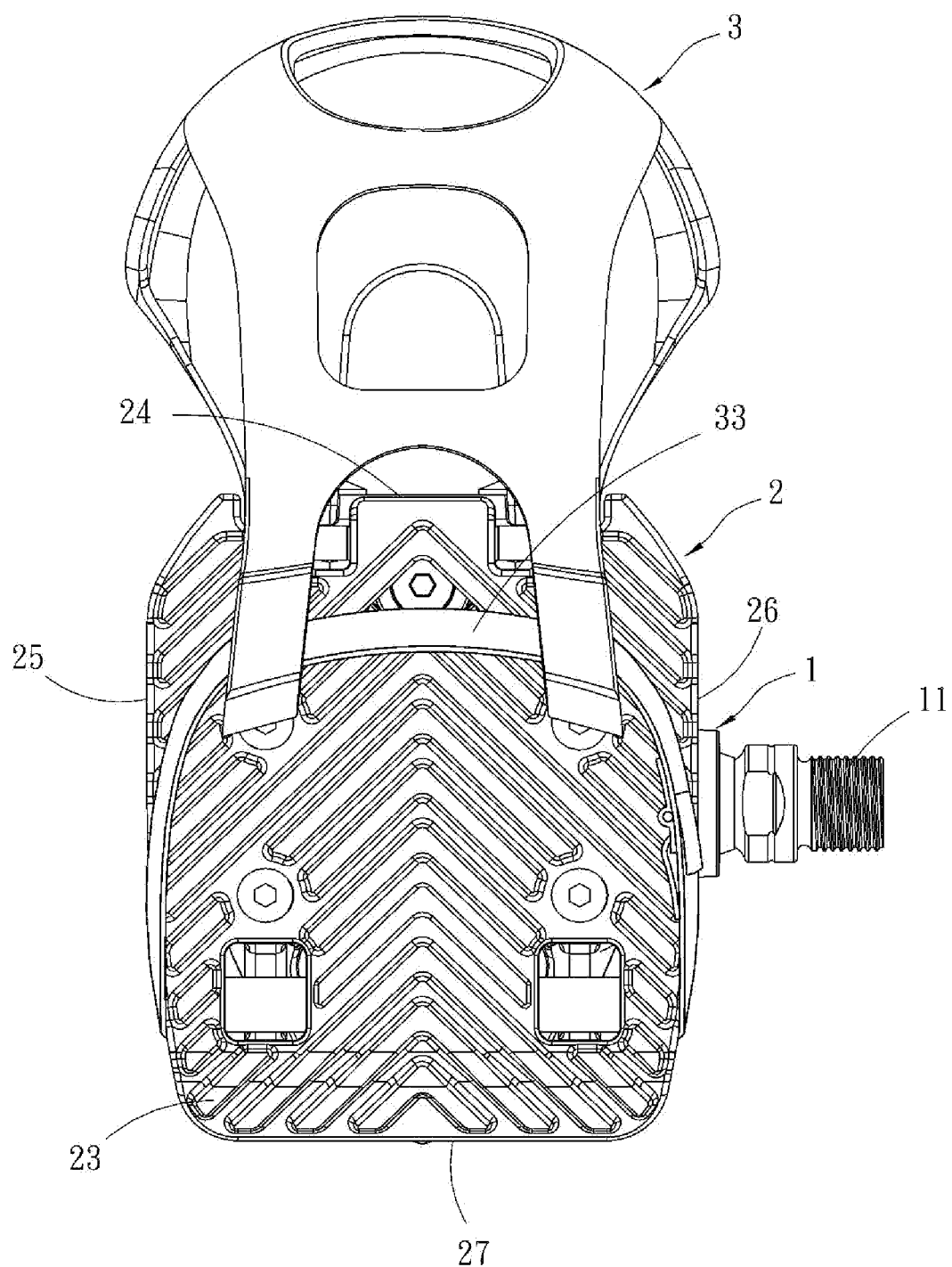
FIG. 4 is a top plan view of the invention.
Figure 5:
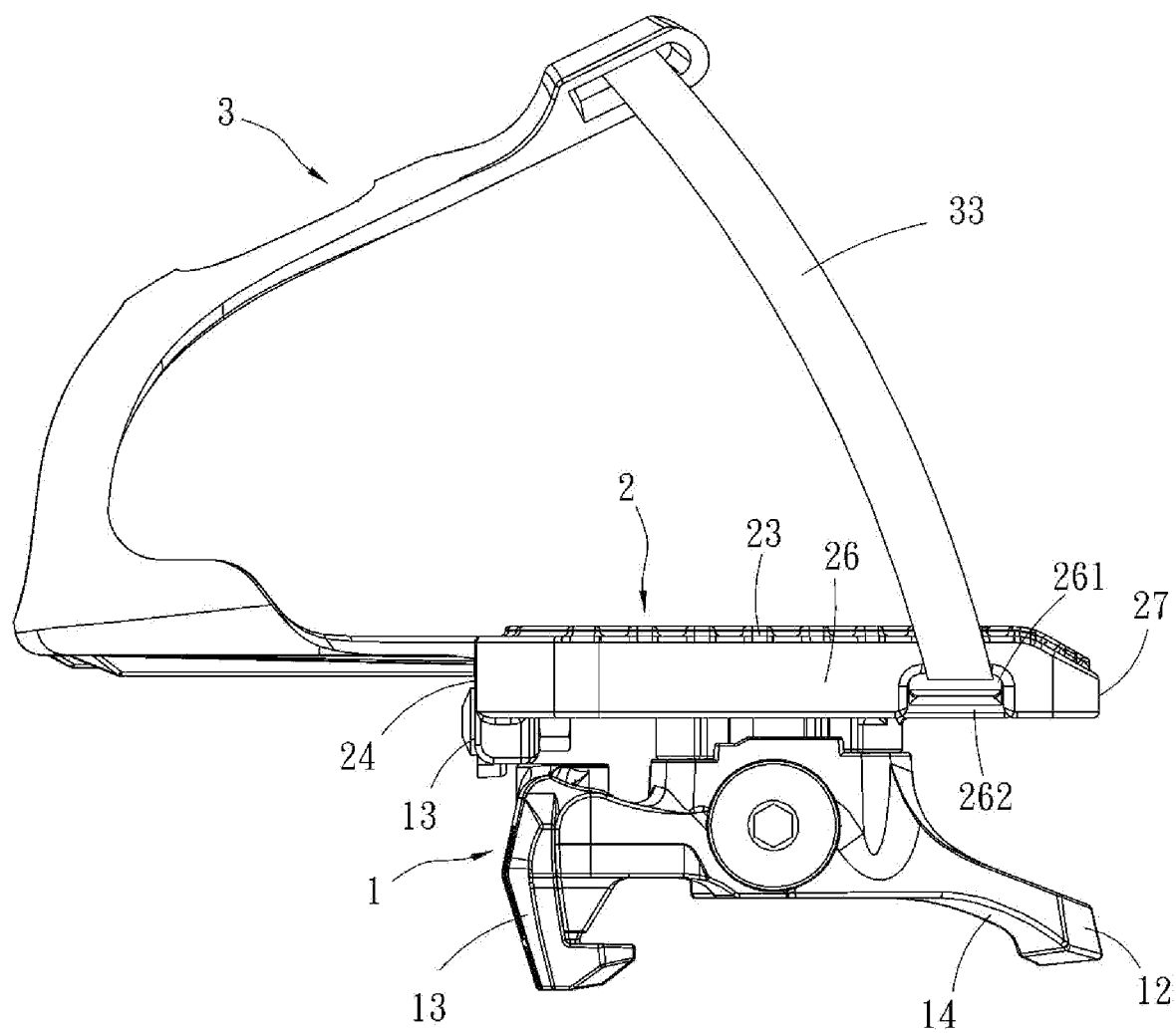
FIG. 5 is a side view of the invention.

The connecting seat 2 is removably fixed on the pedal body 1 to make a clipless pedal stepped by shoes without a cleat. The shoe clip 3 is removably fixed to the connecting seat 2 for additionally binding a rider's sole. In other words, the invention provides a clipless pedal which may optionally add a flat connecting seat 2 for non-binding stepping and may further optionally add a shoe clip 3 for binding stepping. FIGS. 4 and 5 show the combination of the pedal body 1, the connecting seat 2 and the shoe clip 3 of the invention.

As shown, only a little tip of the fixed front 12 of the pedal body 1 projects from the connecting seat 2 while the rest does not project from the connecting seat 2. In other words, the orthographic area of the connecting seat 2 is greater than or equal to that of the pedal body 1.

It will be appreciated by persons skilled in the art that the above embodiment has been described by way of example only and not in any limitative sense, and that various alterations and modifications are possible without departure from the scope of the invention as defined by the appended claims.

What is claimed is:

1. A multi-function bicycle pedal comprising:
   a pedal body, having a spindle, a fixed front and an elastic rear, an engaging surface being formed between the fixed front and the elastic rear configured to connect a cleat, a connecting platform being formed on an opposite side of the engaging surface and at a front side and a rear side of the spindle, and the connecting platform having a locking hole;
   a connecting seat, being a flat plate, having a through hole corresponding to the locking hole for being passed through by a screw so as to removably fasten the connecting seat onto the connecting platform, and an exposed surface of the connecting seat being provided with an anti-slip pattern; and
   a shoe clip, being an arcuate body, comprising a binding strap, and being removably disposed on the connecting seat;
   wherein a front sidewall of the connecting seat is formed with two fixing holes, the shoe clip is provided with a connecting mount corresponding to the connecting seat, the connecting mount is formed with two via holes separately corresponding to the fixing holes, the shoe clip is fixed to the connecting seat by inserting two screws through the fixing holes and the via holes, and the front sidewall of the connecting seat is dented to form an indent portion for being embedded by the connecting mount.

2. The multi-function bicycle pedal of claim 1, wherein an orthographic area of the connecting seat is greater than or equal to an orthographic area of the pedal body.

3. A multi-function bicycle pedal comprising:
   a pedal body, having a spindle, a fixed front and an elastic rear, an engaging surface being formed between the fixed front and the elastic rear configured to connect a cleat, a connecting platform being formed on an opposite side of the engaging surface and at a front side and a rear side of the spindle, and the connecting platform having a locking hole;
   a connecting seat, being a flat plate, having a through hole corresponding to the locking hole for being passed through by a screw so as to removably fasten the connecting seat onto the connecting platform, and an exposed surface of the connecting seat being provided with an anti-slip pattern; and
   a shoe clip, being an arcuate body, comprising a binding strap, and being removably disposed on the connecting seat;
   wherein each of a left sidewall and a right sidewall is formed with a recess for being embedded by the binding strap, a bottom of the connecting seat is provided with a U-shaped body, and an inner hole of the U-shaped body corresponds to the recesses in position for being passed by the binding strap.

* * * * *